US005437912A

United States Patent [19]

Chou et al.

[11] Patent Number: 5,437,912

[45] Date of Patent: Aug. 1, 1995

[54] COATED THIN FILM FOR IMAGING

[75] Inventors: Hsin-Hsin Chou, Woodbury, Minn.; Rebecca M. Williams, Ithaca, N.Y.

[73] Assignee: Minnesota Mining and Manufacturing Company, St. Paul, Minn.

[21] Appl. No.: 161,974

[22] Filed: Dec. 3, 1993

Related U.S. Application Data

[63] Continuation of Ser. No. 776,602, Oct. 11, 1991, abandoned.

[51] Int. Cl.[6] .......... B32B 3/00

[52] U.S. Cl. .......... 428/195; 428/212; 428/323; 428/411.1; 428/484; 428/488.1; 428/913; 428/914

[58] Field of Search .......... 428/195, 212, 323, 411.1, 428/484, 488.1, 913, 914

[56] References Cited

U.S. PATENT DOCUMENTS

| | | | |
|---|---|---|---|
| 3,871,881 | 3/1975 | Mikelsons | 96/1.5 |
| 4,286,008 | 8/1981 | Reed et al. | 428/195 |
| 4,304,815 | 12/1981 | Cugasi, Jr. | 428/280 |
| 4,369,244 | 1/1983 | Eian et al. | 430/257 |
| 4,387,156 | 6/1983 | Crawford et al. | 430/271 |
| 4,409,285 | 10/1983 | Swerdlow | 428/332 |
| 4,426,437 | 1/1984 | Fisch et al. | 430/166 |
| 4,430,366 | 2/1984 | Crawford et al. | 427/162 |
| 4,440,830 | 4/1984 | Wempe | 428/352 |
| 4,535,024 | 8/1985 | Parker | 428/200 |
| 4,554,238 | 11/1985 | Bushman | 430/258 |
| 4,556,595 | 12/1985 | Ochi | 428/143 |
| 4,564,571 | 1/1986 | Masaki | 430/15 |
| 4,587,198 | 5/1986 | Fisch | 430/201 |
| 4,594,307 | 6/1986 | Ishida | 430/203 |
| 4,599,298 | 7/1986 | Fisch | 430/271 |
| 4,657,840 | 4/1987 | Fisch | 430/201 |
| 4,705,739 | 11/1987 | Fisch | 430/276 |
| 4,735,837 | 4/1988 | Miyasaka et al. | 428/40 |
| 4,800,397 | 1/1989 | Afzali-Ardakani et al. | 346/1.1 |
| 4,816,333 | 3/1989 | Lange et al. | 428/331 |
| 4,868,049 | 9/1989 | Nelson | 428/328 |
| 4,875,961 | 10/1989 | Oike et al. | 156/234 |
| 4,882,218 | 11/1989 | Koshizuka et al. | 428/216 |
| 4,892,602 | 1/1990 | Oike et al. | 156/233 |
| 4,892,798 | 1/1990 | Lamanna et al. | 430/38 |
| 4,894,283 | 1/1990 | Wehr | 428/341 |
| 4,894,288 | 1/1990 | Fukada et al. | 428/422 |
| 4,902,364 | 2/1990 | Parker et al. | 428/209 |
| 4,906,523 | 3/1990 | Bilkadi et al. | 428/327 |
| 4,985,321 | 1/1991 | Chou et al. | 430/38 |
| 5,084,330 | 1/1992 | Koshizuka et al. | 428/212 |

FOREIGN PATENT DOCUMENTS

| | | |
|---|---|---|
| 0125086 | 11/1984 | European Pat. Off. . |
| 0134126 | 3/1985 | European Pat. Off. . |
| 0227092 | 7/1987 | European Pat. Off. . |
| 4014866 | 11/1990 | Germany . |
| WO88/04237 | 6/1988 | WIPO . |

OTHER PUBLICATIONS

"Matsushita Takes a Giant Step Forward With its Ribbon Technology," *Office Equipment and Products*, Sep. 1988, by Yasuo Iijima.

"New Color Thermal Transfer Printing Media," presented to The 5th International Congress on Advances in Non-Impact Printing Technologies by Kenjiro Kuroda, San Diego, Calif., Nov. 12–17, 1989.

*Primary Examiner*—Patrick J. Ryan
*Assistant Examiner*—Elizabeth Evans
*Attorney, Agent, or Firm*—Gary L. Griswold; Walter N. Kirn; Gregory D. Allen

[57] ABSTRACT

This invention provides a composite article comprising a support member, a controlled release material coated on the support member, and an inorganic pigment coated onto the controlled release material. In another aspect, this invention provides a method of making the same. The controlled release material comprises a first component and optionally a second component which are independently one of an organic material and an inorganic material. The composite article, which can be a donor substrate, is useful in thermal imaging.

38 Claims, 1 Drawing Sheet

COATED THIN FILM FOR IMAGING

This is a continuation of application No. 07/776,602, filed Oct. 11, 1991, now abandoned.

BACKGROUND OF THE INVENTION

1. Field of the Invention

This invention relates to a composite article comprising a support member, a controlled release material coated onto the support member, and an inorganic pigment; and a method of making the same. The composite article is useful in thermal imaging.

2. Description of the Related Art

Vapor deposited metallic thermal transfer ribbons typically require a release layer interposed between the metallic material to be transferred and the ribbon support in order for the metal to be effectively thermally transferred from the ribbon. Commercial thermal mass transfer printers are typically capable of providing a thermal transfer energy to the ribbons in the range from about 1-3 J/cm$^2$. To produce high resolution images, a vapor deposited metallic thermal transfer ribbon should be constructed such that during thermal imaging at low thermal transfer energies (preferably, less than about 3 J/cm$^2$), the vapor deposited metal transfers from the ribbon at the printed areas and adheres to the ribbon at the non-printed areas.

Various attempts have been made to lower the adhesion of vapor deposited metal to the support member. Such attempts have generally been limited to use of chemical release coatings. Suitable chemical release coatings have a lower surface energy with respect to the support member than with respect to the vapor deposited metal, or vice versa, depending on the particular transfer application.

For example, in the September, 1988, issue of *Office Equipment and Products*, an article entitled "Matsushita Takes a Giant Step Forward With Its Ribbon Technology," described a metal thermal transfer ribbon having a 0.01 micrometer thick exfoliation layer.

A paper entitled "New Color Thermal Transfer Printing Media" presented to "The 5th International Congress on Advances in Non-Impact Printing Technologies" in San Diego, Calif., Nov. 12–17, 1989, described a thermal metallic transfer ribbon having an anchoring layer interposed between the vapor deposited metal and a release layer to secure the vapor deposited metal to the release layer.

U.S. Pat. No. 4,868,049, (Nelson) teaches a transfer sheet comprising, in successive layers, a carrier film, a metallic film, and an adhesive. Optionally, the transfer sheet further comprises, in successive layers, a release coat and a polymer coat interposed between the carrier film and the metallic film, and a primer coat interposed between the metallic film and adhesive. A preferred release coat is said to be made from an ethylene vinyl acetate copolymer.

U.S. Pat. No. 4,892,602, (Oike et al.) discloses a heat-sensitive medium comprising a support, and a transfer layer comprising a protective resin layer, a metal deposition layer, and an adhesive layer, said three layers being provided in that order from the supporting side. Optionally, a lubricant layer may be interposed between the protective resin layer and the support.

U.S. Pat. No. 4,875,961, (Oike et al) discloses a heat-sensitive medium comprising a support, and a transfer layer comprising at least a non-flowable ink layer and an adhesive layer, said two layers being provided in that order from the support side. Optionally, a lubricant layer may be interposed between the ink layer and the support.

While chemical release coatings have had some success in providing for good transfer of vapor deposited metal from a vapor deposited metallic transfer ribbon, there is still a need to improve such means for transferring the vapor deposited metal and to improve the resolution of images produced from such transfer ribbons.

SUMMARY OF THE INVENTION

Briefly, the present invention provides a composite article comprising (a) a support member having a front surface;

(b) a controlled release material coated onto at least a portion of the front surface; and (c) an inorganic pigment coated onto at least a portion of the controlled release material.

The composite article can further comprise an adhesive material overlying the coated inorganic pigment.

In this application:

"controlled release material or CRM" means a material which comprises a first component and optionally admixed with a second component, the CRM being selected from the group consisting of:

(1) a CRM comprising inorganic particles (e.g., oxide or hydrated-oxide particles), preferably essentially free of at least one of organic material derived from latex, wax derived from a wax dispersion, wax derived from solution, or polymer (natural or synthetic) derived from solution;

(2) a CRM comprising low adhesive affinity organic material derived from a latex (i.e., the organic material remaining after the liquid vehicle is removed from a latex), preferably essentially free of at least one of inorganic particles, a high adhesive affinity organic material derived from latex, wax derived from a dispersion, wax derived from solution, or polymer (natural or synthetic) derived from solution;

(3) a CRM comprising a wax derived from a wax dispersion (i.e., the material remaining after the liquid vehicle is removed from a wax dispersion), preferably essentially free of each of inorganic particles, organic material derived from latex, wax derived from solution, and polymer (natural or synthetic) derived from solution;

(4) a CRM comprising an admixture of at least two of inorganic particles (e.g., oxide or hydrated-oxide particles), a low adhesive affinity organic material derived from a latex, and a wax derived from a wax dispersion, preferably essentially free of at least one of a high adhesive affinity organic material derived from latex, wax derived from solution, or polymer (natural or synthetic) derived from solution;

(5) a CRM comprising an admixture of inorganic particles (e.g., oxide or hydrated-oxide particles) and a high adhesive affinity organic material derived from a latex, preferably essentially free of at least one of low adhesive affinity organic material derived from latex, wax derived from wax dispersion, wax derived from solution, or polymer (natural or synthetic) derived from solution;

(6) a CRM comprising an admixture of inorganic particles (e.g., oxide or hydrated-oxide particles) and a high adhesive affinity polymer (natural or synthetic, preferably synthetic) derived from a solution, preferably essentially free of at least one of organic material derived from latex, wax derived from wax dispersion, wax derived from solution, or low adhesive affinity polymer derived from solution; and (7) a CRM comprising an admixture of at least one of a high adhesive affinity organic material derived from a latex and a high adhesive affinity polymer (natural or synthetic, preferably synthetic) derived from a solution, and at least one of a low adhesive affinity organic material derived from a latex, a low adhesive affinity polymer (natural or synthetic, preferably synthetic) derived from a solution, a wax derived from a wax dispersion, or a wax derived from a solution, preferably essentially free of inorganic particles, wherein CRM's (1), (2), (3), (4), and (6) have a thickness up to one monolayer; the CRM is non-tacky at room temperature (i.e., about 25° C.); the CRM, under imaging conditions, has a greater adhesive affinity for the inorganic pigment than for the support member; and wherein the release property of the CRM is controlled by the selection and ratio of component(s);

"organic material" refers to a material having at least one hydrogen-carbon bond;

"latex" means a colloidal organic emulsion or a colloidal organic dispersion;

"derived from latex" refers to the material remaining after the liquid vehicle has been removed from the latex (e.g., by evaporation);

"derived from solution" refers to the material remaining after the solvent has been removed (e.g., by evaporation);

"high adhesive affinity material" refers to a material that, under imaging conditions, has a greater adhesive affinity for the support member than does a low adhesive affinity material; a high adhesive affinity material has a release value of at least 5 g/cm, wherein the release value is determined as described below; preferably, the release value of a high adhesive affinity material is at least 10 g/cm;

"low adhesive affinity material" refers to a material that, under imaging conditions, has a smaller adhesive affinity for the support member than does a high adhesive affinity material; a low adhesive affinity material has a release value of less than 5 g/cm, wherein the release value is determined as described below; preferably, the release value of a low adhesive affinity material is less than 4 g/cm;

"adhesive affinity" means the tendency of one material to adhere to another material;

"tacky," as used in reference to a material, means the material is at least slightly adhesive with respect to another material in which it is in contact;

"support member" refers to a sheet or sheet-like material having a front surface and a back surface; and "inorganic pigment" refers to a thin coating, layer, or film of a metal, a semiconductor, a metal oxide, silica, or combination thereof.

The "release value" of a material is determined as follows. A solution is prepared by dissolving about 16 grams of a thermoplastic polyethylene terephthalate having a specific gravity of about 1.26 g/cm$^3$, a softening point of about 151° C. and a glass transition temperature of about 47° C. (preferably that commercially available under the trade designation "PE222" from Goodyear of Akron, Ohio) and about 4 grams of a thermoplastic polyethylene terephthalate having a specific gravity of about 1.22 g/cm$^3$, a softening point of about 98° C., and a glass transition temperature of about −11° C. (preferably that commercially available under the trade designation "VPE 5545A" from Goodyear) in about 180 grams of ethylene dichloride. The solution is coated onto a conventional 100 micrometer thick extruded polyester sheet and dried to provide a dry thickness of about 5 micrometers. The material to be tested is coated using conventional techniques onto a 6 micrometer thick polyethylene terephthalate sheet (e.g., that commercially available under the trade designation "TR-101" from Toyo Metallizing of Japan, or that available from Teijin of Japan, or Toray of Japan) using conventional coating techniques. The dry thickness of the material coated onto the 6 micrometer thick sheet is about 1.5 micrometers. The coatings of each coated sheet are placed in contact with each other and the resulting assembly run through a thermal printer equipped with a 200 dpi thermal print head (preferably having a Model #DTH 6604E thermal print head from Oki Electronic Industry Co., Inc., of Tokyo, Japan) with a heat transfer value of about 2.4 J/cm$^2$ such that a 2.5 cm wide strip is imaged. The imaging rate is that typically used for thermal imaging (i.e., about 0.75 to about 1.25 cm/second). The printing pressure is about 600 to 700 g/cm$^2$. The assembly is then loaded into a conventional tensile strength tester (e.g., that commercially available from Instron Corp. of Canton, Ohio, as Model #1122). The two sheets are peeled apart at 90 degrees in relation to each other at a rate of about 2.5 cm/minute. The force needed to separate the sheets is then used to calculate the release value.

The adhesive affinity of a high adhesive affinity material to the front surface of the support member can range from about the same as the adhesive affinity of a low adhesive affinity material to the front surface of the support member, to the high adhesive affinity material having an adhesive affinity to the front surface of the support member, and the low adhesive affinity material free of adhesive affinity to the front surface of the support member. Preferably, the adhesive affinity of a high adhesive affinity material to the front surface of the support member is substantially greater than the adhesive affinity of a low adhesive affinity material to the front surface of the support member.

In another aspect, a method for making a composite article according to the present invention comprises the steps of:

(a) providing a support member having a front surface;

(b) coating a controlled release material onto at least a portion of the front surface, and (c) coating an inorganic pigment onto at least a portion of the controlled release material, to provide a composite article according to the present invention.

In a further aspect, the present invention provides a method for printing an inorganic pigment onto a receptor article, the method comprising the steps of one of Method I, Method II, or Method III:

Method I (a) providing a donor article, the donor article comprising (i) a first support member having a front surface;

(ii) a controlled release material coated onto at least a portion of the front surface; and (iii) an inorganic pigment coated onto at least a portion of the controlled release material, (b) providing a receptor article comprising a second support member having a thermoplastic front surface; and (c) transferring at least a portion of the inorganic pigment and at least a portion of the controlled release material from the donor article onto the receptor article by imagewise application of heat through the donor article to the controlled release material and the thermoplastic front surface of the receptor article, wherein during the imagewise application of heat to the coated inorganic pigment, the coated inorganic pigment is in contact with the thermoplastic front surface of the receptor article and sufficient pressure is applied to the donor article and the receptor article to provide intimate contact between the coated inorganic pigment and the thermoplastic front surface of the receptor article, to provide at least a portion of the inorganic pigment and at least a portion of the controlled release material onto the receptor article;

Method II (a) providing a donor article, the donor article comprising
  (i) a first support member having a front surface;
  (ii) a controlled release material coated onto at least a portion of the front surface;
  (iii) an inorganic pigment coated onto at least a portion of the controlled release material; and
  (iv) a thermoplastic material coated onto at least a portion of the inorganic pigment;

(b) providing a receptor article, the receptor article comprising a second support member; and (c) transferring at least a portion of the inorganic pigment and at least a portion of the controlled release material from the donor article onto the receptor article by imagewise application of heat through the donor article to the controlled release material and the thermoplastic material, wherein during the imagewise application of heat to the coated thermoplastic material, the coated thermoplastic material is in contact with the receptor article and sufficient pressure is applied to the donor article and the receptor article to provide intimate contact between the coated thermoplastic material and the receptor article, to provide at least a portion of the inorganic pigment, at least a portion of the controlled release material, and at least a portion of the coated thermoplastic material onto the receptor article; and Method III (a) providing a donor article, the donor article comprising
  (i) a first support member having a front surface;
  (ii) a controlled release material coated onto at least a portion of the front surface; and
  (iii) an inorganic pigment coated onto at least a portion of the controlled release material, (b) providing a receptor article comprising a second support member having a thermoplastic material coated onto the front surface; and (c) transferring at least a portion of the inorganic pigment and at least a portion of the controlled release material from the donor article onto the receptor article by imagewise application of heat through the receptor article to the controlled release material and the thermoplastic material, wherein during the imagewise application of heat to the coated inorganic pigment, the coated inorganic pigment is in contact with the thermoplastic material of the receptor article and sufficient pressure is applied to the donor article and the receptor article to provide intimate contact between the coated inorganic pigment and the thermoplastic material of the receptor article, to provide at least a portion of the inorganic pigment and at least a portion of the controlled release material on the receptor article.

The imagewise application of heat can be supplied by electromagnetic radiation, by a thermal energy source, or combination thereof.

The present invention teaches a means for tailoring the affinity of the controlled release material by adjusting the amount and the particular components comprising the controlled release material.

For example, in one embodiment according to the present invention, the composite article may comprise a controlled release material comprised of an admixture of a high adhesive affinity organic material and a low adhesive affinity organic material, wherein the adhesive affinity of the high adhesive affinity organic material for the surface of the support member is substantially greater than the adhesive affinity of the low adhesive affinity organic material for the front surface of the support material, wherein the high adhesive affinity organic material covers about 80 percent of the front surface of the support member and the low adhesive affinity organic material covers about 20 percent of the front surface of the support member. If for a particular application it is desired to lower the adhesive affinity of the controlled release material to the front surface of the support member, the amount of high adhesive affinity and low adhesive affinity organic material can be adjusted to decrease the amount of the front surface covered by the low adhesive affinity organic material and to increase the amount of the front surface covered by the low adhesive affinity organic material.

The composite article according to the present invention is useful as a donor article for generating high quality graphic images including alphanumeric images. The imaged donor article (i.e., the donor article after at least a portion of the inorganic pigment and at least a portion of the controlled release material has been transferred from the donor article) and the imaged receptor article (i.e., the receptor article after at least a portion of the inorganic pigment has been transferred to the receptor article) according to the present invention are useful for displaying high quality graphic images including alphanumeric images.

Controlled release materials useful in the present invention are disclosed in U.S. Pat. No. 5,139,598, (Chou et al.).

DETAILED DESCRIPTION OF PREFERRED EMBODIMENTS

The present invention provides a means for image transferring an inorganic pigment from a donor article to a receptor article at transfer energies typically less than about 15 J/cm$^2$. Preferably, the controlled release material allows for transfer of an inorganic pigment at a thermal transfer energy of less than about 10 J/cm$^2$. More preferably, the controlled release material allows for transfer at thermal transfer energies less than about 5 J/cm$^2$, and, most preferably, less than about 3 J/cm$^2$.

Figure 1:
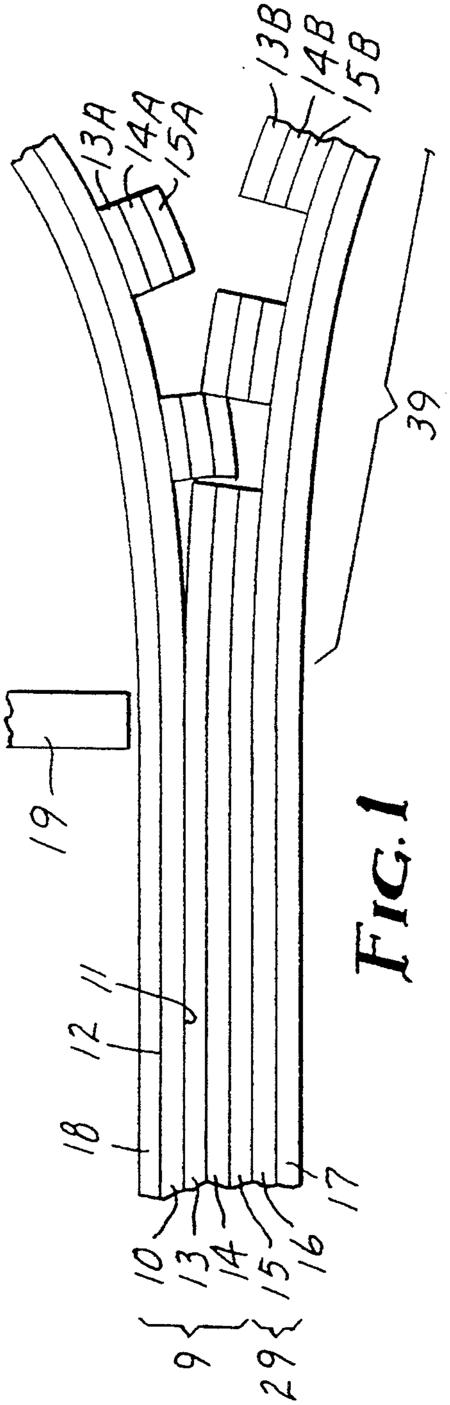
FIGS. 1 and 2 are enlarged cross-sectional views of various composite articles according to the present invention and serve to provide schematic illustrations of methods according to the present invention.

Referring to FIG. 1, donor article 9 comprises support member 10 having front surface 11 and back surface 12, optional back coat 18 coated onto back surface 12, controlled release material 13, inorganic pigment 14, and optional thermoplastic material 15. Receptor article 29 comprises support member 17 and optional thermoplastic material 16, with the proviso that one of the thermoplastic material 15 or 16 is present if support member 17 is not a thermoplastic material.

FIG. 1 also illustrates the transfer of optional thermoplastic material 15, inorganic pigment 14, and controlled release material 13 from donor article 9 to receptor article 29. Receptor article 39 comprises support member 16, optionally one of thermoplastic material 16 or transferred thermoplastic material 15B, transferred inorganic pigment 14B, and transferred controlled release material 13B. The transfer of optional thermoplastic material 15, inorganic pigment 14, and controlled release material 13 from donor article 9 to receptor article 29 is facilitated by energy source 19.

Figure 2:
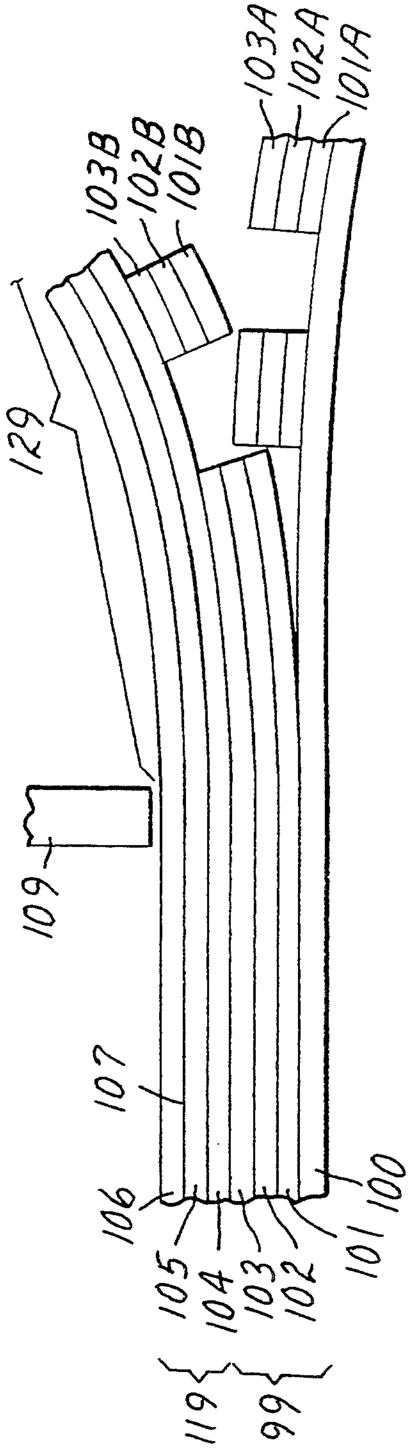

Referring to FIG. 2, donor article 99 comprises support member 100, controlled release material 101, inorganic pigment 102, and optionally thermoplastic material 103. Receptor article 119 comprises support member 105 having back coat 106 coated onto back surface 107 and optionally thermoplastic material 104, with the proviso that one of thermoplastic material 103 or 104 is present if support member 105 is not a thermoplastic material.

FIG. 2 also illustrates the transfer of optional thermoplastic material 103, inorganic pigment 102, and controlled release 101 from donor article 99 to receptor article 119. Receptor article 129 comprises support member 105, thermoplastic material 104, optional transferred thermoplastic material 103B, transferred inorganic pigment 102B, and transferred controlled release material 101B. The transfer of optional thermoplastic material 103, inorganic pigment 102, and controlled release material 101 from donor article 99 to receptor article 119 is facilitated by energy source 109.

The support member for the donor article or receptor article may be any sheet material which is compatible with a process for making a composite article according to the present invention. Typically, the support member for the donor article is a ribbon. The support member may be rough or smooth, transparent or opaque, flexible or rigid, and porous or impervious. Materials which may be suitable as a support member include, for example, natural or synthetic polymeric resins (thermoplastic or thermoset), and ceramics (including glasses, metals, papers, and fabrics. Preferably, the support member is made of a polymeric resin including, for example, polyester, (e.g., polyethylene terephthalate), cellulose ester, polycarbonate, polyvinyl resin, (e.g., polyvinyl chloride, polyvinylidene chloride, polyvinyl butyral, polyvinyl formal), polyamide, polyimide, polyacrylate (e.g., copolymers and homopolymers of acrylic acid, methacrylic acid, n-butyl acrylate, and acrylic anhydride), and polyolefin. The support member may contain conventional fillers such as carbon black, titania, zinc oxide, dyes, colorants, and be treated or coated with those materials generally used in the formation of films such as coating aids, lubricants, antioxidants, ultraviolet radiation absorbers, surfactants, and catalysts. As such, the support member may comprise any number of layers required for coating aids, lubricants, antioxidants, ultraviolet radiation absorbers, surfactants, and catalysts.

A suitable support member for the donor article includes, for example, a polyethylene terephthalate (PET) sheet having a fluorene polyester polymer (FPE) consisting or consisting essentially of repeating, interpolymerized units derived from 9,9-bis-(4-hydroxyphenyl)fluorene and isophalic acid, terephthalic acid, or mixtures thereof, wherein the polymer has a sufficiently low oligomer content to allow formation of a uniform film coated on the back surface thereof. For additional details on the PET sheet having FPE coated on the back surface thereof, see assignee's copending application having U.S. Ser. No. 07/603,800, (Hampl et al.), filed Oct. 26, 1990, the disclosure of which is incorporated herein by reference.

Preferably, the support member comprising the donor article is a 1 to 12 micrometer thick polyethylene terephthalate PET sheet. More preferably, the support member comprising the donor article is a polyethylene terephthalate sheet up to about 6 micrometers thick.

Sources of commercially available support members for the donor article include, for example, E. I. dupont de Nemour of Wilmington, Del.; Teijin of Japan, and Toray of Japan.

Selection of a receptor article is dependent on the construction of the donor article to be used with the receptor article. To facilitate adhesion of the transferred inorganic pigment to the receptor article, a thermoplastic material is present either as a coating over the inorganic pigment, or comprises the receptor article itself (i.e., the receptor article is a thermoplastic or has a thermoplastic material coated on the front surface thereof).

Suitable support members for the receptor article include, for example, a plastic sheet, a paper sheet, or a dye receptor (see, e.g., U.S. Pat. No. 4,853,365, Jongewaard et al., the disclosure of which is incorporated herein by reference). Sources of commercially available support members for the receptor article include, for example, E. I. dupont; Schoeller Technical Papers, Inc., of Pulaski, N.Y.; DaiNippon of Japan, and Calcomp, a Sanders Company of Anaheim, Calif.

The receptor article can also be an imaged receptor article prepared as described in U.S. Pat. No. 5,139,598, (Chou et al.), the disclosure of which is incorporated herein by reference. Such an imaged receptor article has a vapor deposited colorant which has been image transferred from a donor article.

The components of the CRM are typically uniformly dispersed over the surface of the donor support member.

The CRM may comprise conventional colorants or dyes in an amount sufficient to impart a desired color.

Typically, the CRM comprises a first component that covers in the range from greater than zero to 100 percent of the front surface, and a second component that covers in the range from less than 100 to zero percent of the front surface, wherein the first component is admixed with the second component. Preferably, the first component of the controlled release material covers in the range from about 10 to about 80 percent of the front surface of the support member and the second component covers in the range from less than about 90 to greater than about 20 percent of the front surface of the support member, wherein the first component is admixed with the second component. Most preferably, the first component covers in the range from about 30 to about 60 percent of the front surface of the support member and said second component covers in the range from about 70 to greater than about 40 percent of the front surface of the support member, wherein the first component is admixed with the second component.

For CRM's (1), (2), (3), and (4), described above, the CRM covers in the range from about 5 to about 95 percent of the front surface of the support member. Preferably, such CRM's cover in the range from about 10 to about 90 percent of the front surface of the support member, and, most preferably, cover in the range from about 20 to about 75 percent of the front surface of the support member.

For CRM's (5), (6), and (7), described above, the CRM preferably covers about 100 percent of the front surface of the support member.

The CRM can be applied to a substrate surface using conventional means. Such application means include extrusion coating, gravure coating, blade or knife coating, spray coating, brush coating, dip coating, and spin coating. Typically, the CRM is applied to the substrate surface by coating a solution, dispersion, or other coatable material comprising the CRM or precursor(s) thereof.

For example, a CRM comprising inorganic particles can be applied to a substrate surface by coating a boehmite or silica sol and evaporating the liquid vehicle (e.g., air drying, heating, etc.). A CRM comprising inorganic particles dispersed in a polymeric material can be applied to a substrate by coating a dispersion of inorganic particles in a polymeric solution or dispersion, and then evaporating the liquid vehicle. To aid dispersing the inorganic particles, the dispersion or sol may further comprise conventional dispersing aids known for such use.

Preferred starting materials for the inorganic component of a CRM include, for example, aluminum monohydrate or boehmite particles, which are commercially available under the trade designations "DISPERAL" from Condea Chemie, GMBH of Hamburg, Germany, and "CATAPAL D" from Vista Chemical Company of Houston, Tex.; hydrophobic $SiO_2$ particles, which are commercially available under the trade designation "TULLANOX" from Tulcon, Inc., of Ager, Mass.; alumina particles, titania particles; zirconia particles; graphite particles; and carbon particles.

The particle size of inorganic particles comprising a CRM is preferably in the range from about 0.01 to about 10 micrometers. More preferably, the particle size of such inorganic particles is in the range from about 0.01 to about 1 micrometer; even more preferably in the range from about 0.01 to about 0.1 micrometer; and most preferably in the range from about 0.02 to about 0.07 micrometer. Use of inorganic particles having particle sizes within the preferred ranges tend to provide higher resolution images when the article according to the present invention is used to produce images.

Preferred commercially available starting materials for high adhesive affinity synthetic polymers include, for example, aqueous polymers (e.g., poly(ethyloxazoline)), which is available under the trade designation "PEOX" from Dow Chemical USA of Midland, Mich., and sulfonated poly(ethylene terephthalate), which is available under the trade designation "AMORPHOUS SULFOPOLYESTERS" from the 3M Company of St. Paul, Minn.; also see U.S. Pat. No. 4,480,085, (Larson); medium (e.g., about 30,000 to about 40,000) and high (e.g., greater than about 40,000) molecular weight poly(vinylpyrrolidone) (PVP), which are commercially available, for example, under the trade designations "PVP K-30" and "PVP K-90," respectively from Aldrich Chemical Co., Inc., of Milwaukee, Wis.; organic solvent soluble polymers (e.g., poly(vinyl acetate) in toluene), which is available, for example, under the trade designation "DESOGRAPH E337" from Desota, Inc., of Fort Worth, Tex., and a modified acrylic, which is available, for example, under the trade designation "DESOGRAPH E333" from Desota, Inc.

Preferred commercially available starting materials for high adhesive affinity latexes include, for example, vinyl acrylic, which is available, for example, under the trade designation "UNOCAL" from Union Oil Co. of Schaumburg, Ill.; acrylic emulsion, which is available, for example, under the trade designation "PHOPLEX B-60A" from Rohm and Haas of Philadelphia, Pa.; an acrysol colloidal dispersion, which is available, for example, under the trade designation "WS-24" from Rohm and Haas; poly(vinyl acetate), which is available, for example, under the trade designation "WALLPOL 40-100" from Reichhold Chemicals, Inc., of Dover, Del.; and vinyl acetate/acrylic acid resins from Reichhold.

Preferred commercially available starting materials for low adhesive affinity synthetic polymers include, for example, aqueous polymers (e.g., polyvinyl alcohol (PVA)) and low molecular weight (e.g., below about 30,000) poly(vinylpyrrolidone) (PVP), which is commercially available, for example, from Aldrich Chemical Co., Inc.); organic solvent soluble polymers (e.g., polyacrylic acid), which is available under the trade designation "ELVACITE 2250" from E. I. dupont; a fatty acid (e.g., myristic acid); hydrogenated rosin ester; polyethylene, which is available under the trade designation "PICCOLASTIC" from Hercules Inc. of Wilmington, Del.; and rosin derived dimeric acid resin which is available under the trade designation "DYMERIX RESIN" from Hercules Inc.

Preferred starting materials for low adhesive affinity natural polymers include, for example, a hydrogenated rosin ester, which is commercially available, for example, under the trade designation "STAYBELITE ESTER 10" from Hercules Inc. of Wilmington, Del., and a rosin-based ester such as that commercially available under the trade designation "SYLVATEC 1085" from Arizona Chemical Co. of Panama City, Fla.

Preferred commercially available low adhesive affinity latexes include, for example, an acrylic resin, which is available, for example, under the trade designation "CARBOSET" from Goodyear of Brecksville, Ohio, and a polytetrafluoroethylene dispersion, which is, for example, available under the trade designation "FLUOTRON 110" from E. I. dupont. Another preferred commercially available low adhesive affinity latex, if a component in a CRM having a thickness up to one monolayer, is ethylene acrylic acid (EAA), which is available, for example, from Morton International of Chicago, Ill. EAA, however, tends to behave as a high adhesive affinity latex when EAA is a component of a CRM having thickness in excess of a monolayer.

The preferred particle size ranges for organic material derived from latexes are the same as described above for inorganic particles.

Preferred commercially available waxes include, for example, chlorinated paraffin waxes, carnauba wax, shell waxes, multiwaxes, and beeswax.

A wax dispersion can be prepared using conventional techniques. A preferred wax dispersion comprises a chlorinated paraffin wax (e.g., commercially available under the trade designation "CHLOREZ 70" from Dover Chemical Corp. of Dover, Ohio) dispersed in water.

A wax solution can be prepared using conventional techniques. A preferred wax solution comprises a chlorinated paraffin wax (e.g., commercially available under the trade designations "CHLOREZ 700," "CHLOREZ 725," and "CHLOREZ 760") dissolved in an organic solvent (e.g., toluene or methyl ethyl ketone).

Preferably, the thickness of a coated CRM is in the range from greater than zero to about 15 micrometers. More preferably, thickness of such a coated CRM is in the range from greater than zero to about 10 micrometers; even more preferably, it is in the range from greater than zero to about 5 micrometers; and most preferably, it is in the range from greater than zero to about 1 micrometer. While not wanting to be bound by theory, it is believed that the thickness of the coated CRM need only be a monolayer, wherein the thickness is determined by the smallest dimension of largest component (i.e., molecule or particle) comprising the CRM. Thicknesses substantially greater than about 15 micrometers tend to provide an image with poor resolution.

For CRM's (1), (2), (3), (4), and (6) described above, however, the thickness of the CRM is up to one monolayer.

The inorganic pigment is a thin coating, layer, or film of a metal, a semiconductor, a metal oxide, silica, or a combination thereof. The inorganic pigment can be a continuous thin coating or a discontinuous thin coating (e.g., the inorganic pigment can be deposited onto the CRM as a graphic or alphanumeric image).

Metals useful as an inorganic pigment include, for example, transition metals, noble metals, and rare earth metals. Such metals include metals selected from the elements of atomic numbers 11-106. More important metals in order of atomic number are: aluminum, scandium, titanium, vanadium, chromium, manganese, iron, cobalt, nickel, copper, zinc, gallium, germanium, yttrium, zirconium, niobium, molybdenum, ruthenium, rhodium, palladium, silver, cadmium, indium, tin, antimony, lanthanum, gadolinium, hafnium, tantalum, tungsten, rhenium, osmium, iridium, platinum, gold, thallium, and lead. The most preferred metals, all of which are non-ferromagnetic, are aluminum, copper, gold, iridium, palladium, platinum, rhodium, silver, rhenium, ruthenium, osmium, indium, tin, and lead.

Semiconductors useful as an inorganic pigment include, for example, carbon (including diamond graphite, etc.), silicon, arsenic, gallium arsenide, gallium antimonide, gallium phosphide, aluminum antimonide, indium antimonide, indium tin oxide, zinc antimonide, indium phosphide, aluminum gallium arsenide, and zinc telluride.

Metal oxides useful as an inorganic pigment include, for example, oxides of aluminum, titanium, chromium, iron, cobalt, manganese, nickel, copper, zinc, indium, tin, antimony, and lead. The most preferred metal oxide is black aluminum oxide.

The inorganic pigment can be deposited onto the coated release material using techniques known in the art for vacuum depositing such materials onto a support member. Preferably, the inorganic pigment is vapor deposited onto the coated release material. Useful vacuum deposition techniques for coating the inorganic pigment include, for example, radio frequency (RF), plasma, chemical vapor deposition, epitaxy deposition, resistive heating, sputtering, and electron beam deposition methods.

A preferred method of depositing a metal oxide is disclosed in U.S. Pat. No. 4,430,366, (Crawford et al.), the disclosure of which is incorporated herein by reference, wherein a controlled amount of oxygen is introduced into a metal vapor stream.

For the deposition of a discontinuous thin coating, layer, or film of inorganic pigment, the deposition techniques can be modified as is known in the art to produce such discontinuous coatings. Known modifications include, for example, use of masks and shutters.

Typically, the thickness of the coated inorganic pigment is in the range from greater than zero to about 100 micrometers. Preferably, the coated inorganic pigment has a thickness in the range from greater than zero to about 50 micrometers. More preferably, the thickness of the coated inorganic pigment is in the range from greater than zero to about 10 micrometers, and even more preferably, the thickness is in the range from greater than zero to about 1 micrometer. Thicknesses substantially greater than about 100 micrometers tend not to transfer very well (i.e., produce poor image resolution).

The optional thermoplastic material of the donor article or receptor article provides a means for adhering the transferred inorganic pigment to a substrate (e.g., a receptor article). Preferably, the thermoplastic material is tacky in the temperature range from about 40° to about 300° C. More preferably, the thermoplastic material is tacky in the range from about 60° to about 200° C., and most preferably, it is tacky in the range from about 65° to about 150° C.

Suitable commercially available thermoplastic materials include, for example, polyethylene terephthalate which Goodyear markets under the trade designation "PE222."

The thermoplastic material can be applied to the coated inorganic pigment or to a substrate by methods known in the art, for example, solvent extrusion coating.

Preferably, thickness of the optional thermoplastic material coated onto the inorganic pigment is in the range from greater than zero to about 25 micrometers. More preferably, thickness of the thermoplastic material is in the range from greater than zero to about 10 micrometers; even more preferably, it is in the range from greater than zero to about 5 micrometers; and most preferably, in the range from greater than zero to about 1 micrometer. Thicknesses substantially greater than about 25 micrometers tend to not transfer very well (i.e., produce poor resolution).

The thickness of a thermoplastic coated onto a receptor support member is typically at least 1 micrometer.

An image prepared according to the present invention typically has a resolution of at least about 100 dots/cm. Preferably, the resolution of an image prepared according to the present invention is at least about 200 dots/cm, and more preferably at least about 300 dots/cm.

Means for imagewise application of heat through the donor or the receptor include those known in the art for thermal imaging such as thermal stylus, electroresistive heating, heat lamp and mask, and microwave.

For conventional thermal imaging printers having a thermal stylus, the pressure applied to the donor article and the receptor article during imaging is typically in the range from about 300 to about 700 g/cm$^2$. Pressures substantially below about 150 g/cm$^2$ tend to produce incomplete transfer. Pressures greater than about 700 g/cm$^2$ are useful, but such high pressures are typically unnecessary for good transfer (i.e., to produce an image with high resolution).

The donor article according to the present invention is capable of high resolution printing and are useful for generating high quality graphic images including alphanumeric images. The imaged donor and imaged receptor articles according to the present invention are useful for displaying high quality graphic images including alphanumeric images.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

The following dispersions, solutions, or adhesives were used in one or more of the Examples.

"Dispersion 1" was prepared by dispersing 10 grams of hydrophobic $SiO_2$ (commercially available under the trade designation "TULLANOX" from Tulcon, Inc., of Ager, Mass.) and 10 grams of an acrylic copolymer (commercially available under the trade designation "B99" from Rohm and Haas of Philadelphia, Pa.) in 380 grams of toluene.

"Solution 2" was prepared by dissolving 15 grams of thermoplastic PET (commercially available under the trade designation "PE222" from Goodyear of Akron, Ohio) in 85 grams of ethyl chloride. (A preferred solvent, however, is methyl ethyl ketone.)

"Solution 3" was prepared by dissolving 19 grams of a thermoplastic PET ("PE222") and 1 gram of chlorinated paraffin wax (commercially available under the trade designation "CHLOROWAX 70" from Diamond Shamrock of Cleveland, Ohio) in 80 grams of ethyl chloride.

"Dispersion 4" was prepared by dispersing 27.8 grams of boehmite (commercially available under the trade designation "DISPERAL" from Condea Chemie of Hamburg, Germany) and 1 gram of a surfactant (commercially available under the trade designation "TRITON X-100" from Rohm and Haas) in 71.2 grams of deionized water.

"Dispersion 5" was prepared by blending 1 gram of a 3 percent $SiO_2$ sol (commercially available under the trade designation "NALCO 2327" from Nalco Chemical Co. of Oak Brook, Ill.) and 1 gram of a surfactant ("TRITON X-100").

"Adhesive 6" was prepared by first dispersing 7.5 grams of a hydrophobic $SiO_2$ ("TULLANOX") and 7.5 grams of a chlorinated paraffin wax ("CHLOROWAX 70") in 925 grams of toluene. The dispersion of hydrophobic $SiO_2$("NALCO 2327") chlorinated paraffin wax, and toluene were then blended with 21 grams of a carnauba wax (commercially available from Frank B. Ross Co., Inc., of Jersey City, N.J.) and 14 grams of a petroleum wax (commercially available under the trade designation "SHELLWAX 700" from Shell Chemical Co. of Houston, Tex.); 10.4 grams of a chlorinated paraffin wax (commercially available under the trade designation "CHLOREZ 760" from Dover Chemical Co. of Dover, Ohio); 8.4 grams of synthetic candelilla wax (commercially available from Frank B. Ross Co.); 5 grams of a copolymer of ethylene and vinyl acetate (commercially available under the trade designation "ELVAX 210" from E. I. DuPont de Nemour of Wilmington, Del.); 0.8 grams of a methyl acrylate polymer (commercially available under the trade designation "ACRYLOID C10V" from Rohm and Haas); and hydrogenated rosin ester (commercially available under the trade designation "STAYBELITE ESTER 10" from Hercules, Inc. of Wilmington, Del.).

"Dispersion 7" was prepared by dispersing 2.5 grams of boehmite (commercially available under the trade designation "CATAPAL D" from Vista Chemical Company of Houston, Tex.) into 171.5 grams of deionized water and 1 gram of a surfactant ("TRITON 100").

"Solution 8" was prepared by dispersing 16 grams of a thermoplastic PET ("PE222") and 4 grams of a second thermoplastic PET (commercially available under the trade designation "VPE 5545A" from Goodyear) in 180 grams of ethyl dichloride.

"Dispersion 9" was prepared by dispersing 1 gram of boehmite ("CATAPAL D") into 199 grams of deionized water.

"Dispersion 10" was prepared by dispersing 39 grams of boehmite ("CATAPAL D") and 1 gram of polyvinylalcohol (PVA) (commercially available under the trade designation "VINOL" from Air Products and Chemicals of Allentown, Pa.) in 760 grams of deionized water.

"Dispersion 11" was prepared by dispersing 1 gram of a modified acrylic dispersion (commercially available under the trade designation "CARBOSET 514H" from BF Goodrich of Breckville, Ohio) and 1 gram of PVA ("VINOL") in 98 grams of deionized water.

"Dispersion 12" was prepared by dispersing 1 gram of a sulfonated polyethylene terephthalate PET (commercially available under the trade designation "VIKING POLYMER" from the Minnesota Mining and Manufacturing (3M) Company of St. Paul, Minn.) and 1 gram of polyvinyl pyrrolidone (PVP) (commercially available under the trade designation "PVP K-15" from Aldrich Chemical Co., Inc., of Milwaukee, Wis.) in 98 grams of deionized water.

"Dispersion 13" was prepared by dispersing 1 gram of a polyethyloxazoline polymer (commercially available under trade designation "PEOX" from Dow Chemical Co. of Midland, Mich.) and 1 gram of a PVP ("PVP K-15") in 98 grams of deionized water.

"Dispersion 14" was prepared by dispersing 1 gram of a modified acrylic dispersion ("CARBOSET 514H") and 1 gram of ethylene acrylic acid (EAA) (commercially available under the trade designation "ADCOTE EAA" from Morton International of Chicago, Ill.) in 98 grams of aleionized water.

"Dispersion 15" was prepared by dispersing 1 gram of a modified acrylic dispersion ("CARBOSET 514H") and 1 gram of a PVP ("PVP K-30") in 98 grams of deionized water.

"Dispersion 16" was prepared by dispersing 1 gram of chlorinated paraffins (commercially available under the trade designation "CHLOREZ 70" from Dover Chemical Corp. ) and 2 grams of modified acrylics (commercially available under the trade designation "DESOGRAPH E333" from Desoto, Inc., of Des Plaines, Ill.).

"Dispersion 17" was prepared by dispersing 1 gram of a hydrogenated rosin ester ("STAYBELITE ESTER 10") and 2 grams of modified acrylics ("DESOGRAPH E333") in 5997 grams of toluene.

"Dispersion 18" was prepared by dispersing 1 gram of microcrystalline wax (melting point=77°-82° C.; commercially available under the trade designation "SONNEBORN'S MULTIWAX" from Witco Corp. of Melrose Park, Ill.) and 2 grams of modified acrylics ("DESOGRAPH E333") in 5997 grams of toluene.

"Dispersion 19" was prepared by dispersing 1 gram of a petroleum wax ("SHELLWAX") and 2 grams of modified acrylics ("DESOGRAPH E333") in 5997 grams of deionized water.

"Dispersion 20" was prepared by dispersing 1 gram of acrylic resin (commercially available under the trade designation "ELVACITE 2550" from E. I. Dupont de Nemours Co.) and 2 grams of modified acrylics ("DESOGRAPH E333") in 5997 grams of toluene.

"Dispersion 21" was prepared by dispersing 1 gram of rosin ester (commercially available under the trade designation "DYMEREX RESIN" from Hercules Inc.) and 2 grams of modified acrylics ("DESOGRAPH E333") in 5997 grams of deionized water.

"Dispersion 22" was prepared by dispersing 1 gram of myristic acid (commercially available from Witco Corp. ) and 2 grams of modified acrylics ("DESOGRAPH E333") in 5997 grams of deionized water.

"Dispersion 23" was prepared by dispensing 14.3 grams of an aluminum monohydrate sol (about 20 percent boehmite; commercially available under the trade designation "DISPAL 120 ALUMINA SOL" from Vista Chemical Company) and 1.14 grams of a surfactant ("TRITON X-100") in 996 grams of deionized water.

"Solution 24" was prepared by dissolving 24.3 grams of a modified acrylic solution (60 percent toluene; commercially available under the trade designation "DESOGRAPH E-327" from DeSoto, Inc.), 3.6 grams of a hydrogenated rosin ester ("STAYBELITE ESTER 10"), and 1.8 grams of ethyl cellulose (glass transition=45° C.; melting point=165° C.; commercially available from Aldrich Chemical Co.) in 980 grams of toluene.

"Dispersion 25" was prepared by dispersing 10.5 grams of a thermoplastic PET (commercially available under the trade designation "VPE 5833" from Goodyear), and 4.5 grams of a hydrogenated rosin ester ("STAYBELITE ESTER 10") in 85 grams of methyl ethyl ketone.

"Dispersion 26" was prepared by dispersing 0.43 gram of fluorene polyester (prepared as describe in assignee's copending patent application entitled "Thermographic Elements," U.S. Ser. No 07/603,800, filed Oct. 26, 1990), 0.43 gram of poly(vinyl stearate) (commercially available from Aldrich Chemical Co.), and 0.14 gram of poly(vinyl butyral) (commercially available under the trade designation "BUTVAR B76" from Monsanto Polymers and Petrochemicals Co. of St. Louis, Mo.).

"Dispersion 27" was prepared by dispersing 5.1 grams of EAA latex (35 percent latex particles; commercially available under the trade designation "ADCOTE 50T 4990" from Morton International) and 0.18 gram of a surfactant ("TRITON X-100") in 94.7 grams of deionized water.

"Dispersions 28, 29, 30, and 31" were prepared by successively diluting Dispersion 27 with deionized water to provide dispersions comprising about 1, 0.5, 0.2, and 0.1 weight percent latex, respectively, based on the total weight of each respective dispersion.

"Dispersion 32" was prepared by dispersing 4.9 grams of latex ("ADCOTE 50T 4990") and 0.17 gram of surfactant ("TRITON X-100") in 94.8 grams of deionized water.

"Dispersions 33 and 34" were prepared by successively diluting Dispersion 32 with deionized water to provide dispersions comprising about 0.95 and 0.48 weight percent latex, respectively, based on the total weight of each respective dispersion.

"Dispersion 35" was prepared by dispersing 1.75 grams of silica sol ("NALCO 2327") and 0.3 gram of a surfactant ("TRITON X-100") in 98 grams of ethanol.

"Dispersion 36, 37, 38, 39, and 40" were prepared by successively diluting Dispersion 35 with deionized water to provide dispersions comprising about 0.5, 0.2, 0.1, 0.05, and 0.02 weight percent silica, respectively, based on the total weight of each respective dispersion.

"Dispersion 41" was prepared by dispersing 0.14 gram of boehmite ("CATAPAL D") and 0.06 gram of a surfactant ("TRITON X-100") in 99.8 grams of ethanol.

"Dispersions 42, 43, 44, 45, and 46" were prepared by successively diluting Dispersion 41 with ethanol to provide dispersions comprising about 0.1, 0.5, 0.02, 0.01, and 0.005 weight percent boehmite, respectively, based on the total weight of each dispersion.

"Dispersion 47" was prepared by dispersing 2 grams of boehmite ("CATAPAL D") in 98 grams of ethanol.

"Dispersions 48, 49, 50, 51, and 52" were prepared by successively diluting Dispersion 47 with ethanol to provide dispersions comprising about 1, 0.5, 0.2, 0.1, and 0.05 weight percent boehmite, respectively, based on the total weight of the dispersion.

"Dispersions 53, 54, 55, 56, 57 and 58" were prepared by dispersing 2, 1.3, 1, 0.67, and zero grams of a thermoplastic PET ("VPE 5833"), respectively, and zero, 0.67, 1, 1.3, and 2 grams of a hydrogenated rosin ester ("STAYBELITE ESTER 10") respectively, in 98 grams of methyl ethyl ketone.

"Dispersions 59, 60, 61, 62, and 63" were prepared by dispersing 2, 1.3, 1, 0.67, and zero grams of a thermoplastic PET ("PE222"), respectively, and zero, 0.67, 1, 1.3, and 2 grams of a hydrogenated rosin rester ("STAYBELITE ESTER"), respectively, in 98 grams of methyl ethyl ketone.

The imaging rate for all examples was about 0.75 to about 1.25 cm/second.

Comparative Example A

Samples 1 and 2 were prepared as follows. A release coating was coated onto a 6 micrometer thick polyethylene terephthalate PET sheet (commercially available under the trade designation "MYLAR" from E. I. dupont) using a #10 Meyer rod (from R & D Specialties of Webster, N.Y.) and conventional coating techniques. The coating conditions for coating a dispersion onto the PET sheet are given in Table 1, below. The dispersion was dried in a heated oven at a temperature of about 80° C. for about 1 minute, to provide a release layer (i.e., a CRM).

TABLE 1A

DONOR ARTICLE

TABLE 1A-continued

| Sample | Dispersion coated | Meyer rod # used to coat dispersion | Metal layer deposited on the release layer | Thickness of metal layer deposited on the release layer, nanometers |
|---|---|---|---|---|
| 1 | 1 | 10 | copper | 48 |
| 2 | 1 | 10 | copper | 78 |

TABLE 1B

| RECEPTOR ARTICLE | | | |
|---|---|---|---|
| Sample | Receptor article | Heat transfer energy, J/cm$^2$ | Resolution, dots per cm (dots per inch) |
| 1 | U.S. Pat. No. 4,919,994; Example 1 | 1.4 | 79 (200) |
| 2 | U.S. Pat. No. 4,919,994; Example 1 | 1.9 | 39 (100) |

A metal layer was deposited onto the release layer using a conventional batch, resistive heated vapor coater. The metal deposited and the thickness of the deposited metal layer are given in Table 1, above.

A portion of the metal layer was transferred from the donor article to a transfer base film (U.S. Pat. No. 4,919,994, Ludear et al.; Example 1, the disclosure of which is incorporated herein by reference) using a thermal printer equipped with a 200 dpi thermal print head (printer head commercially available from Oki Electronic Industry Co., Inc., of Tokyo, Japan; Model #DTH 6604E), wherein the donor article was sandwiched between the receptor article and the printing head. The pressure applied to the donor article and receptor article was about 600 to 700 g/cm$^2$. The heat transfer values used to transfer the metal from the donor article to the receptor article are given in Table 1, above.

Transfer of copper from the release layer comprising the donor article to the receptor article appeared to be excellent for each sample. Resolution of the resulting metallic image on the receptor article for Samples 1 and 2 was about 79 dots per cm and about 39 dots per cm, respectively.

Comparative Example 2

Samples 3 and 4 were prepared in the same manner as Sample 1 of Example 1 except a #4 Meyer rod used to coat Dispersion 1 onto the PET sheet, the thickness of the metal layer deposited onto the release layer was about 50 nm and 64 nm, respectively, heat transfer value was about 2.1 J/cm, and receptor articles were 0.1 mm (4 mil) thick PET sheets (conventional hot melt extruded PET). Further, the PET receptor articles for Samples 3 and 4 were coated with Solution 2 and Solution 3, respectively, using conventional coating techniques and a #5 Meyer rod. (See Tables 2A and 2B, below.)

TABLE 2A

| DONOR ARTICLE | | | | |
|---|---|---|---|---|
| Sample | Dispersion coated | Meyer rod # used to coat dispersion | Metal layer deposited on the release layer | Thickness of metal layer deposited on the release layer, nanometers |
| 3 | 1 | 4 | copper | 64 |
| 4 | 1 | 4 | copper | 50 |

TABLE 2B

| RECEPTOR ARTICLE | | | | | |
|---|---|---|---|---|---|
| Sample | Substrate | Solution coated | Coating thickness, micrometers | Heat transfer energy, J/cm$^2$ | Resolution, dots per cm (dots per inch) |
| 3 | PET | 2 | 5 | $<2.1$ | $>79$ (200) |
| 4 | PET | 3 | 5 | $<2.1$ | $>79$ (200) |

Transfer of copper from the release layer comprising the donor article to the receptor article appeared to be excellent for each sample.

Resolution of the resulting metallic image on the receptor article was greater than 79 dots per cm (200 dots per inch) for each sample.

Comparative Example C

Samples 5 and 6 were prepared in the same manner as Sample 1 (see Comparative Example A) except the dispersion coated onto the PET sheet was Dispersion 4 and Dispersion 5, respectively, a #4 Meyer rod was used to coat the dispersion onto the PET sheet, thickness of the metal layer deposited onto the release layer was about 50 nm, and the heat transfer value was about 1.6–1.9 J/cm$^2$ for Sample 5 and about 1.9–2.1 J/cm$^2$ for Sample 6, respectively. (See Tables 3A and 3B, below.) Further, the receptor article was as described in Example 1.

TABLE 3A

| DONOR ARTICLE | | | | |
|---|---|---|---|---|
| Sample | Dispersion coated | Meyer rod # used to coat dispersion | Metal layer deposited on the release layer | Thickness of metal layer deposited on the release layer, nanometers |

TABLE 3A-continued

| | | | | |
|---|---|---|---|---|
| 5 | 4 | 4 | copper | 50 |
| 6 | 5 | 4 | copper | 50 |

TABLE 3B

| | RECEPTOR ARTICLE | | |
|---|---|---|---|
| Sample | Receptor article | Heat transfer energy, J/cm$^2$ | Resolution, dots per cm (dots per inch) |
| 5 | U.S. Pat. No. 4,919,994; Example 1 | 1.6-1.9 | <79 (200) |
| 6 | U.S. Pat. No. 4,919,994; Example 1 | 1.9-2.1 | <79 (200) |

Transfer of copper from the release layer comprising the donor article to the receptor article appeared to be excellent for both samples.

Resolution of the resulting metallic image on the receptor article was greater than 79 dots per cm (200 dots per inch).

Example 1

Samples 7 and 8 were prepared as follows. A release coating was coated onto a PET sheet as described in Comparative Example A except the dispersion coated was Dispersion 4 and a #4 Meyer rod was used. A 10 nm thick copper layer was deposited over the release layer as described in Comparative Example A. Using conventional coating techniques and a #30 Meyer rod, "Adhesive 6" was coated over the deposited metal layer to provide a donor article. (See Table 4A, below.) A portion of the layer metal layer and adhesive layer were transferred from the donor article to a receptor article using the thermal printer described in Comparative Example A. The receptor article for the Sample 7 image was a 75 micrometer (3 mil) thick PET sheet (conventional hot melt extruded PET). The receptor article for Sample 8 was a 75 micrometer (3 mil) thick thermal paper (commercially available from Calcomp, a Sanders Company of Anaheim, Calif.). (See Table 4B, below.)

TABLE 4A

| | DONOR ARTICLE | | | |
|---|---|---|---|---|
| Sample | Dispersion coated | Meyer rod # used to coat dispersion | Metal layer deposited on the release layer | Thickness of metal layer deposited on the release layer, nanometers |
| 7 | 4 | 4 | copper | 70 |
| 8 | 4 | 4 | copper | 70 |

TABLE 4B

| | RECEPTOR ARTICLE | | | | |
|---|---|---|---|---|---|
| Sample | Adhesive coating | Thickness of adhesive coating, micrometers | Substrate | Heat transfer energy, J/cm$^2$ | Resolution, dots per cm (dots per inch) |
| 7 | 6 | 4 | PET | 2.1 | 79 (200) |
| 8 | 6 | 4 | Calcomp Paper | 2.1 | 79 (200) |

Transfer of copper and adhesive from each of the donor articles to the receptor articles appeared to be excellent. Resolution of each of the resulting metallic images was about 79 dots per cm (200 dots per inch).

Example 2

Example 2 illustrates the imaging method shown in FIG. 2. The receptor article was prepared by coating Dispersion 7 onto a 75 micrometer (3 mil) thick PET sheet (conventional hot melt extruded PET) using conventional coating techniques and a #10 Meyer rod. Dried thickness of the coated dispersion was about 100 nm. (See Table 5A, below.)

TABLE 5A

| | DONOR ARTICLE | | | |
|---|---|---|---|---|
| Sample | Dispersion coated | Meyer rod # used to coat dispersion | Metal layer deposited on the release layer | Thickness of metal layer deposited on the release layer, nanometers |
| 9 | 7 | 10 | copper | 53 |

A 53 nm thick copper layer was deposited over the release coat as described in Comparative Example A.

The donor article was prepared by coating "Solution 8" onto a 6 micrometer thick PET sheet (type F polyester film; commercially available from Teijin of Japan) using conventional coating techniques and a #10 Meyer rod. Dried thickness of the coated dispersion was about 2.5 micrometers. (See Table 5B, below.)

TABLE 5B

| | | RECEPTOR ARTICLES | | | | |
|---|---|---|---|---|---|---|
| Sample | Substrate | Solution coated | Meyer rod # used to coat coat dispersion | Coating thickness, micrometers | Heat transfer energy, J/cm$^2$ | Resolution, dots per cm (dots per inch) |

TABLE 5B-continued

| | | | | | | |
|---|---|---|---|---|---|---|
| 9 | PET | 8 | 10 | 1.6 | 1.4 | 79 (200) |

A portion of the metal and release coat from the donor article was transferred to the receptor article using the thermal printer described in Comparative Example A, wherein the receptor article was sandwiched between the donor article and the printing head. Heat transfer energy was about 1.4 J/cm$^2$. Resolution of the "negative" image on the donor article was about 79 dots per cm (200 dots per inch).

Comparative Example D

The donor article for Comparative Example D was prepared by coating Dispersion 9 onto a 6 micrometer thick PET sheet (Type F polyester film from Teijin) using conventional coating techniques and a #4 Meyer rod. The dispersion was dried in a forced air oven for about 1 minute at a temperature of about 80° C., to provide a release layer. A 23 nm aluminum layer was vapor deposited onto the release layer using a conventional batch, resistive heated vapor coater (see Table 6A, below).

TABLE 6A

| | DONOR ARTICLE | | | |
|---|---|---|---|---|
| Sample | Dispersion coated | Meyer rod # used to coat dispersion | Metal layer deposited on the release layer | Thickness of metal layer deposited on the release layer, nanometers |
| 10 | 9 | 4 | aluminum | 23 |
| 11 | 9 | 4 | aluminum | 23 |
| 12 | 9 | 4 | aluminum | 23 |

The receptor articles for Samples 10, 11, and 12 were ethylene acrylic acid (EAA) coated paper (light weight base paper coated with 50 micrometers (2 mils) of ("PRIMACORE EAA")) from Schoeller Technical Paper, Inc., of Pulaski, N.Y., a dye receptor (prepared as described in Example 3 of U.S. Pat. No. 4,853,365, (Jongewaard et al.), the disclosure of which is incorporated herein by reference), and transfer base film prepared as described in Example 1 of U.S. Pat. No. 4,919,994, (Ludear et al.), the disclosure of which is incorporated herein by reference.

A portion of the metal from the donor article was transferred to each of the receptor articles using the thermal printer described in Comparative Example A. Heat transfer values for Samples 10, 11, and 12 were about 1.4, 1.9, and 2.1 J/cm$^2$, respectively Resolution of each image on the receptor article was about 79 dots per cm (See Table 6B, below.)

TABLE 6B

| Sample | Receptor article | Heat transfer energy, J/cm$^2$ | Resolution, dots per cm (dots per inch) |
|---|---|---|---|
| 10 | EAA coated paper | 1.4 | 79 (200) |
| 11 | dye receptor | 1.9 | 79 (200) |

TABLE 6B-continued

| Sample | Receptor article | Heat transfer energy, J/cm$^2$ | Resolution, dots per cm (dots per inch) |
|---|---|---|---|
| 12 | transfer base | 2.1 | 79 (200) |

Example 3

Sample 13 was prepared according to the description for Sample 10 (see Comparative Example B) except the coated dispersion was Dispersion 10, thickness of the aluminum layer was about 45 nm, and heat transfer energy was about 1.2 J/cm$^2$. ( See Tables 7A and 7B, below.)

TABLE 7A

| | DONOR ARTICLE | | | |
|---|---|---|---|---|
| Sample | Dispersion coated | Meyer rod # used to coat dispersion | Metal layer deposited on the release layer | Thickness of metal layer deposited on the release layer, nanometers |
| 13 | 10 | 4 | aluminum | 45 |

TABLE 7B

| Sample | Receptor article | Heat transfer energy, J/cm$^2$ | Resolution, dots per cm (dots per inch) |
|---|---|---|---|
| 13 | EAA coated paper | 1.2 | 79 (200) |

Resolution of the image was about 79 dots per cm (200 dots per inch).

Comparative Example E

The donor articles for Comparative Example E were prepared by coating the dispersions listed in Table 8A (below) onto 6 micrometer thick PET sheets (Type F polyester film from Teijin) using continual coating techniques and a #4 Meyer rod. Each coated dispersion was dried in a conventional forced air oven at about 90° for about 1 minute to provide a release layer. Copper and silver metal layers were vapor coated onto the release layer.

TABLE 8A

| | DONOR ARTICLE | | | |
|---|---|---|---|---|
| Sample | Dispersion coated | Meyer rod # used to coat dispersion | Metal layer deposited on the release layer | Thickness of metal layer deposited on the release layer, nanometers |
| 14 | 11 | 4 | copper | 47 |
| 15 | 12 | 4 | copper and silver | 10.5 (Cu) and 18.2 |

TABLE 8A-continued

| | DONOR ARTICLE | | | |
|---|---|---|---|---|
| Sample | Dispersion coated | Meyer rod # used to coat dispersion | Metal layer deposited on the release layer | Thickness of metal layer deposited on the release layer, nanometers |
| | | | | (Ag) |
| 16 | 13 | 4 | copper and silver | 7.3 (Cu) and 17 (Ag) |
| 17 | 14 | 4 | copper | 47 |
| 18 | 15 | 4 | copper | 61 |

A portion of the metal from each donor article was transferred to EAA coated paper (same as in Example 6), using the thermal printer described in Comparative Example A. Heat transfer energy value for each transfer was about 1.4 $J/cm^2$. (See Table 8B, below.)

TABLE 8B

| Sample | Receptor article | Heat transfer energy, $J/cm^2$ | Resolution, dots per cm (dots per inch) |
|---|---|---|---|
| 14 | EAA coated paper | 1.4 | 79 (200) |
| 15 | EAA coated paper | 1.4 | 79 (200) |
| 16 | EAA coated paper | 1.4 | 79 (200) |
| 17 | EAA coated paper | 1.4 | 79 (200) |
| 18 | EAA coated paper | 1.4 | 79 (200) |

Resolution of each image was about 79 dots per cm (200 dots per inch).

Comparative Example F

Donor articles for Comparative Example F were prepared by coating the dispersions listed in Table 9A (below) onto 6 micrometer thick PET sheets (Type F polyester film from Teijin) using conventional coating techniques and a #3 Meyer rod. Each coated dispersions was dried in a conventional forced air oven for about 1 minute at a temperature of about 80° C., to provide a release layer. Copper or copper and silver metal layers were coated onto the release layer as described in Comparative Example E.

TABLE 9A

| | DONOR ARTICLE | | | |
|---|---|---|---|---|
| Sample | Dispersion coated | Meyer rod # used to coat dispersion | Metal layer deposited on the release layer | Thickness of metal layer deposited on the release layer, nanometers |
| 19 | 16 | 3 | copper | 56 |
| 20 | 17 | 3 | copper | 56 |
| 21 | 18 | 3 | copper | 56 |
| 22 | 19 | 3 | copper | 56 |
| 23 | 20 | 3 | copper and silver | 5.5 (Cu) and 15.1 (Ag) |
| 24 | 21 | 3 | copper and silver | 3.5 (Cu) and |

TABLE 9A-continued

| | DONOR ARTICLE | | | |
|---|---|---|---|---|
| Sample | Dispersion coated | Meyer rod # used to coat dispersion | Metal layer deposited on the release layer | Thickness of metal layer deposited on the release layer, nanometers |
| | | | | 15.5 (Ag) |
| 25 | 22 | 3 | copper and silver | 5.5 (Cu) and 15.1 (Ag) |

Receptor articles were prepared by coating Dispersion 6 onto a 100 micrometer (4 mil) thick PET sheet (conventional hot melt extruded PET).

A portion of the metal from each donor article was transferred to a receptor article using the thermal printer described in Comparative Example A. Heat transfer energy for each sample is listed in Table 9B, below.

TABLE 9B

| Sample | Substrate | Dispersion coated | Meyer rod # used to coat dispersion | Heat transfer energy, $J/cm^2$ | Resolution, dots per cm (dots per inch) |
|---|---|---|---|---|---|
| 19 | PET | 6 | 16 | 1.4 | 79 (200) |
| 20 | PET | 6 | 16 | 1.4 | 79 (200) |
| 21 | PET | 6 | 16 | 1.4 | 79 (200) |
| 22 | PET | 6 | 16 | 1.4 | 79 (200) |
| 23 | PET | 6 | 16 | 1.9 | 79 (200) |
| 24 | PET | 6 | 16 | 1.9 | 79 (200) |
| 25 | PET | 6 | 16 | 1.9 | 79 (200) |

Resolution of each image was about 79 dots per cm (200 dots per inch).

Example 4

The donor article for Example 4 was prepared by coating Dispersion 23 onto a 22.9 cm (9 inch) wide 6 micrometer thick polyethylene terephthalate web (Type F polyester film from Teijin) using a conventional solvent extrusion coater. Wet thickness of the coated dispersion was about 10 micrometers. The coating was dried in a 50 m long, conventional forced air oven at a temperature of about 80° C. (180° F.), wherein the rate through the oven was about 30 m/min (100 ft./min.). The average dry thickness of the coating was about 0.04 micrometer. Because the average particle size of the boehmite in the boehmite sol ("DISPAL 120 ALUMINA SOL") was about 0.07 micrometer, the effective area coverage was about 57 percent.

A 31 nm thick layer of aluminum was deposited onto the dried boehmite layer using a conventional vapor coater equipped with a resistive heater and a continuous aluminum feed source.

The receptor article was prepared by coating a 0.1 micrometer (4 mil) thick polyethylene terephthalate web (conventional hot melt extruded PET) with Dispersion H using a conventional solvent extrusion coats. Wet thickness of the coating was about 5 micrometers. The dispersion was dried in the 50 m long, conventional forced air oven at a temperature of about 80° C., wherein the rate through the oven was about 30 m/min.

A portion of the adhesive, aluminum, and controlled release material (i.e., dried Dispersion 23) was transferred from the donor article to the receptor article using a dot growth thermal printer (commercially available under the trade designation "EPL-8543" from Panasonic of Secaucus, N.J.). The pressure applied to the donor article and receptor article was about 300 to 500 g/cm$^2$. The transferred graphic image exhibited sharp edge definition and high resolution. Dot size of the image was about 20–25 micrometers.

Example 5

The donor article for Example 5 was prepared as described in Example 10 except an adhesive was coated onto the deposited aluminum.

The adhesive was coated onto the aluminum as follows. Solution 24 was coated onto the deposited aluminum using a conventional solvent extrusion coater. The wet thickness of the coated solution was about 10 micrometers. The coating was dried in a 50 m long, conventional forced air oven at a temperature of about 80° C. (180° F.), wherein the rate through the oven was about 30 m/min. (100 ft./min.). Average dry thickness of the coated solution was about 0.2 micrometer.

The receptor article was prepared by coating Dispersion 25 onto a 0.1 micrometer (4 mil) thick polyethylene terephthalate (conventional hot melt extruded PET), using conventional coating techniques and a #20 Meyer rod. The dispersion was dried in the 50 m long, conventional forced air oven at a temperature of about 80° C., wherein the rate through the oven was about 30 m/min.

A portion of the aluminum and boehmite (i.e., the controlled release layer) was transferred from the donor article to the receptor article using the thermal printer described in Example 1, wherein the receptor article was sandwiched between the donor article and the printing head. The transferred graphic image exhibited sharp edge definition and high resolution. The dot size of the image was about 20–25 micrometers.

Example 6

Sample 26 was prepared as follows. A 10 micrometer thick layer of a boehmite sol (0.4 percent boehmite ("CATAPAL D") was coated onto a 6 micrometer thick polyethylene terephthalate web, commercially available from Teijin. The layer of boehmite sol was dried in the 50 m long, conventional forced air oven at a temperature of about 80° C., wherein the rate through the oven was about 30 m/min.

A 0.25 micrometer thick layer of black aluminum oxide was coated onto the boehmite layer (i.e., release layer) according to the technique taught in U.S. Pat. Nos. 4,364,995 and 4,430,366 (Crawford et al.), the disclosure of which is incorporated herein by reference, except a chilled roll was not used. The resulting article was the donor article.

The back surface of a 6 micrometer thick polyethylene terephthalate sheet (from Teijin) was coated with Dispersion 26 using a conventional solution extrusion coater. The coated dispersion was dried in the 50 m long, conventional forced air oven at about 80° C., wherein the rate through the oven was about 30 m/min. Thickness of the dried coating was about 0.1 micrometer. The front surface of the PET web was then coated with Dispersion 8 using a conventional solution extrusion coater. The coated dispersion was dried in the 50 m long, forced air oven as just described. Thickness of the dried coating on the front side of the PET web was about 2.5 micrometers. The resulting article was the receptor article.

A portion of the black aluminum oxide and a portion of the boehmite was transferred from the donor article to the receptor article using the printer described in Example 5. The receptor article was sandwiched between the donor article and the print head. Heat transfer value was about 1.6 J/cm$^2$. Resolution of the image on both the receptor article and donor article was greater than about 236 dots per cm (600 dots per inch).

Examples 7–13

Examples 13 to 19 illustrate release characteristics of various controlled release material coatings. Coverage of the release coat on the front surface of a donor article was varied. For example, if the CRM covers 75 percent of the front surface of the donor article, then 25 percent of the front surface is not covered. If the CRM covers 100 percent of the front surface of the donor article, then there is one monolayer of the CRM covering the front surface of the substrate. If the CRM covers 200 percent of the front surface of the donor article, then the amount of CRM coated is enough to provide two monolayers of the CRM.

Example 7

Samples 26 to 29 and composition A were each prepared by coating Dispersions 27, 28, 29, 30, and 31, respectively, onto 6 micrometer thick PET sheet (from Teijin) using conventional coating techniques and a #4 Meyer rod. Surface coverage provided by each dispersion is given in Table 10, below.

TABLE 10

| Sample | Dispersion coated | Percent coverage of the front surface of the donor article by CRM, percent | Thickness of metal layer deposited on the release layer, nanometers | Heat transfer energy, J/cm$^2$ | Resolution, dots per cm (dots per inch) |
|---|---|---|---|---|---|
| 26 | 27 | 88.5 | 54 | 1.6 | 79 (200) |
| 27 | 28 | 44.5 | 54 | 1.6 | 79 (200) |
| 28 | 29 | 22.0 | 54 | >2.1 | under transfer* |
| 29 | 30 | 8.5 | 54 | >2.1 | under transfer* |
| Comparative Example G | 31 | 4.5 | 54 | >2.1 | no transfer |

*Image was not completely transferred from the donor article to the receptor article.

Each coated dispersion was dried in a conventional forced air oven at about 80° C. for about 1 minute.

First, the average dry thickness of the coated dispersion was calculated using the following equation, $$ADT = \frac{(5 \text{ micrometers}) (S) (MR\#)}{300},$$

wherein ADT is the average dry thickness of the coated dispersion, S is the percent solids of the coated dispersion, and MR# is the Meyer rod # used to coat the dispersion.

The equation is based on cm average dry thickness (5 micrometers) of a 15 percent solids dispersion coated using a #20 Meyer rod. The average dry thickness of a particular dispersion is then calculated by dividing the average dry thickness of coated dispersion by the average particle size of the particles comprising the dispersion. The average particle size of the latex particles comprising Dispersions 27, 28, 29, 30, and 31 was about 150 nm.

A layer of copper was deposited onto each dried dispersion (i.e., the controlled release material) using a conventional vacuum coater. Thickness of each metal layer was about 54 nanometers.

The receptor article was prepared as described in Comparative Example F.

A portion of each metal layer and each controlled release material were transferred from each donor article to the receptor using the printer described in Comparative Example A. The heat transfer value for each sample, as well as the result of the image, is provided in Table 10, above.

Example 8

Samples 30 to 32 were prepared and imaged as described in Example 8 except the CRM's were derived from Dispersions 32, 33, and 34, respectively, the thickness of the metal layer was about 44 nm, and the receptor article was EAA coated paper (see Comparative Example D). Results are provided in Table 11, below.

TABLE 11

| Sample | Dispersion coated | Percent coverage of the front surface of the donor article by CRM, percent | Thickness of metal layer deposited on the release layer, nanometers | Heat transfer energy, J/cm$^2$ | Resolution, dots per cm (dots per inch) |
|---|---|---|---|---|---|
| 30 | 32 | 85.0 | 44 | 1.3 | 79 (200) |
| 31 | 33 | 42.5 | 44 | 1.3 | 79 (200) |
| 32 | 34 | 21.2 | 41 | 1.3 | under transfer* |

*Image was not completely transferred from the donor article to the receptor article.

Example 9

Samples 33 to 38 were prepared and imaged as described in Example 13 except the controlled release material was derived from Dispersions 35, 36, 37, 38, 39, and 40, respectively, thickness of the metal layer was about 76.5 nm, and the receptor article was EAA coated paper (see Comparative Example D). The average particle size of the silica particles was about 20 nm. Results are summarized in Table 12, below.

TABLE 12

| Sample | Dispersion coated | Percent coverage of the front surface of the donor article by CRM, percent | Thickness of metal layer deposited on the release layer, nanometers | Heat transfer energy, J/cm$^2$ | Resolution, dots per cm (dots per inch) |
|---|---|---|---|---|---|
| 33 | 35 | 333 | 76.5 | -0- | Contact transfer* |
| 34 | 36 | 167 | 76.5 | -0- | Contact transfer* |
| 35 | 37 | 67 | 76.5 | 1.3 | 79 (200) |
| 36 | 38 | 33 | 76.5 | 1.3 | 79 (200) |
| 37 | 39 | 17 | 76.5 | 1.6 | 79 (200) |
| 38 | 40 | 7 | 76.5 | 1.6 | 79 (200) |

*Coated metal and CRM transferred from the donor article to the receptor article under the printer pressure, without application of energy (i.e., heat transfer value was zero).

Example 10

Samples 39 to 42 and Comparative Examples H and I were prepared and imaged as described in Example 7 except the controlled release material was derived from Dispersions 41, 42, 43, 44, 45, and 46, respectively, the thickness of the metal layer range from about 28 to about 98 nm, and the receptor article was EAA coated paper (see Comparative Example D). The average particle size of the boshmite particles was about 75 nm. Results are provided in Table 13, below.

TABLE 13

| Sample | Dispersion coated | Percent coverage of the front surface of the donor article by CRM, percent | Thickness of metal layer deposited on the release layer, nanometers | Heat transfer energy, J/cm$^2$ | Resolution, dots per cm (dots per inch) |
|---|---|---|---|---|---|
| 39 | 41 | 17.3 | 80 | 1.5 | 79 (200) |
| 40 | 42 | 8.6 | 75 | 1.3 | 79 (200) |
| 41 | 43 | 4.3 | 86 | 1.6 | 79 (200) |
| 42 | 44 | 1.7 | 98 | 1.6 | 79 (200) |
| Comparative Example H | 45 | 0.9 | 53 | 2.1 | No transfer |
| Comparative Example I | 46 | 0.4 | 28 | 2.1 | No transfer |

Example 11

Samples 43 to 47 and Comparative Example J were prepared and imaged as described in Example 7 except the controlled release material was derived from Dispersions 47, 48, 49, 50, 51, and 52, respectively, and the thickness of the metal layer range from about 90 nm and the receptor article was EAA coated paper (see Example 6). The average particle size of the boehmite particles was about 75 nm. Results are provided in Table 14, below.

TABLE 14

| Sample | Dispersion coated | Percent coverage of the front surface of the donor article by CRM, percent | Thickness of metal layer deposited on the release layer, nanometers | Heat transfer energy, J/cm$^2$ | Resolution, dots per cm (dots per inch) |
|---|---|---|---|---|---|
| 43 | 47 | 177.0 | 90 | 0.95 | over transfer* |
| 44 | 48 | 88.6 | 90 | 1.5 | over transfer* |
| 45 | 49 | 44.3 | 90 | 1.5 | over transfer* |
| 46 | 50 | 17.7 | 90 | 1.3 | 79 (200) |
| 47 | 51 | 8.8 | 90 | 2.1 | 79 (200) |
| Comparative Example J | 52 | 4.4 | 90 | 2.1 | No transfer |

*A portion of the unheated area of metal and CRM transferred from the donor article to the receptor article.

Example 12

Samples 48 to 52 were prepared and imaged as described in Example 7 except the controlled release material was derived from Dispersions 53, 54, 55, 56, 57, and 58, respectively, the thickness of the metal layer range from about 70 nm, and the receptor article was EAA coated paper (see Comparative Example D). Thickness of the dried dispersions were each about 0.1 micrometer. Results are provided in Table 15, below.

TABLE 15

| Sample | Dispersion coated | Weight ratio of low adhesive affinity organic material to high adhesive affinity organic material | Thickness of the metal coated onto the release layer, nanometers | Heat transfer energy, J/cm$^2$ | Resolution, dots per cm (dots per inch) |
|---|---|---|---|---|---|
| 48 | 53 | 0:1 | 70 | 2.1 | under transfer* |
| 49 | 54 | 1:2 | 70 | 1.6 | 79 (200) |
| 50 | 55 | 1:1 | 70 | 1.3 | 79 (200) |
| 51 | 56 | 2:1 | 70 | 1.3 | 79 (200) fuzzy edges** |
| 52 | 57 | 1:0 | 70 | 1.3 | over transfer*** |

*Image was not completely transferred from the donor article to the receptor article.
**Transfer at the edges of image was not complete.
***A portion of the unheated area of metal and CRM transferred from the donor article to the receptor article.

Example 13

Samples 53 to 56 and Comparative Example K were prepared and imaged as described in Example 7 except the controlled release material was derived from Dispersions 59, 60, 61, 62, and 63, respectively, the thickness of the metal layer was about 44 nm, and the receptor article was EAA coated paper (see Comparative Example D). Thickness of the dried dispersions were each about 0.1 micrometer. Results are summarized in Table 16, below.

TABLE 16

| Sample | Dispersion coated | Weight ratio of low adhesive affinity organic material to high adhesive affinity organic material | Thickness of the metal coated onto the release layer, nanometers | Heat transfer energy, J/cm$^2$ | Resolution, dots per cm (dots per inch) |
|---|---|---|---|---|---|
| Comparative Example K | 59 | 0:1 | 44 | >3.8 | No transfer |
| 53 | 60 | 1:2 | 44 | 3.2 | fuzzy edges* |
| 54 | 61 | 1:1 | 44 | 2.4 | 79 (200) fuzzy edges* |
| 55 | 62 | 2:1 | 44 | 1.6 | 79 (200) |
| 56 | 63 | 1:0 | 44 | 1.3 | 79 (200) |

*Transfer at the edges of the image were not complete.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A composite article comprising:

(a) a support member having a thermoplastic front surface;

(b) a controlled release material coated directly onto at least a portion of said thermoplastic front surface; and (c) a vapor coated inorganic pigment coated directly onto at least a portion of said controlled release material.

2. The article according to claim 1 wherein said controlled release material comprises a first component that covers in the range from greater than zero to about 100 percent of said front surface and a second component that covers in the range from less than 100 to zero percent of said front surface, wherein said first component is admixed with said second component.

3. The composite article according to claim 1 wherein said controlled release material has a thickness in the range from greater than zero to about 15 micrometers.

4. The composite article according to claim 1 wherein said controlled release material is selected from the group consisting of a controlled release material comprising inorganic particles, a controlled release material comprising a low adhesive affinity organic material derived from latex, and a controlled release material comprising a wax derived from a wax dispersion, said controlled release material having a thickness up to one monolayer.

5. The composite article according to claim 4 wherein said controlled release material covers in the range from about 5 to about 95 percent of said front surface of said support member.

6. The composite article according to claim 4 wherein said controlled release material covers in the range from about 20 to about 75 percent of said front surface of said support member.

7. The composite article according to claim 1 wherein said controlled release material comprises at least two of inorganic particles, a low adhesive affinity organic material derived from a latex, or a wax derived from a wax dispersion, said controlled release material having a thickness up to one monolayer.

8. The composite article according to claim 7 wherein said controlled release material covers in the range from about 5 to about 95 percent of said front surface of said support member.

9. The composite article according to claim 8 wherein said controlled release material covers in the range from about 20 to about 75 percent of said front surface of said support member.

10. The composite article according to claim 1 wherein said controlled release material is selected from the group consisting of (a) a controlled release material comprising an admixture of inorganic particles and a high adhesive affinity latex; (b) a controlled release material comprising an admixture of inorganic particles and a high adhesive affinity polymer derived from solution; and (c) a controlled release material comprising an admixture of at least one of a high adhesive affinity organic material derived from a latex or a high adhesive affiliity polymer derived from a solution, and at least one of a low adhesive affinity organic material derived from a latex, a low adhesive affinity polymer derived from a solution, a wax derived from a wax dispersion, or a wax derived from a solution, said controlled release material of (b) having a thickness of up to one monolayer.

11. The composite article according to claim 1 further comprising a thermoplastic material that overlays at least a portion of said inorganic pigment.

12. The composite article according to claim 1 wherein said support member further comprises a back surface, and further comprising a back coat coated onto said back surface.

13. The composite article according to claim 1 wherein said composite article is a donor article.

14. The composite article according to claim 11 wherein said thermoplastic material has a thickness in the range from greater than zero to about 25 micrometers.

15. The article according to claim 1 wherein said controlled release material comprises a first component that covers in the range from about 10 to about 80 percent of said front surface and a second component that covers in the range from less than about 90 to greater than about 20 percent of said front surface, wherein said first component is admixed with said second component.

16. The article according to claim 1 wherein said controlled release material comprises a first component that covers in the range from about 30 to about 60 percent of said front surface and a second component that covers in the range from less than about 70 to greater than about 40 percent of said front surface, wherein said first component is admixed with said second component.

17. The composite article according to claim 1 wherein said support member is a polyethylene terephthalate.

18. The composite article according to claim 1 wherein said controlled release material comprises at least one organic material selected from the group consisting of an aqueous soluble polymer and an organic solvent soluble polymer.

19. The composite article according to claim 1 wherein said controlled release material comprises particles of inorganic material selected from the group consisting of alumina, silica, aluminum monohydrate, titania, zirconia, graphite, and carbon.

20. The composite article according to claim 1 wherein said support member is a thermoplastic polymeric resin.

21. The composite article according to claim 1 wherein said inorganic pigment is selected from the group consisting of a metal selected from the group consisting of aluminum, scandium, titanium, vanadium, chromium, manganese, iron, cobalt, nickel, copper, zinc, gallium, germanium, yttrium, zirconium, niobium, molybdenum, technetium, ruthenium, rhodium, palladium, silver, cadmium, indium, tin, antimony, lanthanum, gadolinium, hafnium, tantalum, tungsten, rhenium, osmium, iridium, platinum, gold, thallium, and lead; a semiconductor selected from the group consisting of carbon, silicon, arsenic, gallium, arsenide, gallium antimonide, gallium phosphide, aluminum antimonide, indium antimonide, indium tin oxide, zinc antimonide, indium phosphide, aluminum gallium arsenide, and zinc teluride; an oxide of a metal selected from the group consisting of aluminum, titanium, chromium, iron, cobalt, manganese, nickel, copper, zinc, indium, tin, antimony, and lead; silica; and combinations thereof.

22. The composite article according to claim 1 wherein said inorganic pigment is selected from the group consisting of copper, aluminum, and silver.

23. The composite article according to claim 1 wherein said inorganic pigment is black aluminum oxide.

24. The composite article according to claim 1 wherein said coated controlled release material has a thickness in the range from greater than zero to about 15 micrometers.

25. The composite article according to claim 1 wherein said coated inorganic pigment has a thickness in the range from greater than zero to about 1 micrometer.

26. The composite article according to claim 1 wherein said support member includes a layer of thermoplastic material, said thermoplastic material providing said thermoplastic front surface of said support member.

27. A method for making a composite article, said method comprising the steps of:

(a) providing a 'support member having a thermoplastic front surface;

(b) coating a controlled release material directly onto at least a portion of said thermoplastic front surface; and
(c) vapor coating an inorganic pigment directly onto at least a portion of said controlled release material, to provide a composite article.

28. The method according to claim 27 wherein said controlled release material is selected from the group consisting of a controlled release material comprising inorganic particles, a controlled release material comprising a low adhesive affinity organic material derived from latex, and a controlled release material comprising a wax derived from a wax dispersion, and wherein step (b) provides, on said thermoplastic front surface, a controlled release material having a thickness up to one monolayer.

29. The method according to claim 27 wherein said controlled release material comprises at least two of inorganic particles, a low adhesive affinity material derived from a latex, or a wax derived from a wax dispersion, and wherein step (b) provides, on said thermoplastic front surface, a controlled release material having a thickness up to one monolayer.

30. The method according to claim 27 wherein said controlled release material is selected from the group consisting of (a) a controlled release material comprising an admixture of inorganic particles and a high adhesive affinity latex; (b) a controlled release material comprising an admixture of inorganic particles and a high adhesive affinity polymer derived from solution; and (c) a controlled release material comprising an admixture of at least one of a high adhesive affinity organic material derived from a latex or a high adhesive affinity polymer derived from a solution, and at least one of a low adhesive affinity organic material derived from a latex, a low adhesive affinity polymer derived from a solution, a wax derived from a wax dispersion, or a wax derived from a solution, and wherein step (b) provides, on said thermoplastic front surface, a controlled release material of (b) having a thickness of up to one monolayer.

31. The method according to claim 27 further comprising the step of coating a thermoplastic material onto at least a portion of said inorganic pigment.

32. The method according to claim 24 wherein said support member includes a layer of thermoplastic material, said thermoplastic material providing said thermoplastic front surface of said support member.

33. A method for printing an inorganic pigment onto a receptor article, said method comprising the steps of one of Method I, II, or III:

Method I (a) providing a donor article, said donor article comprising
  (i) a first support member having a thermoplastic front surface;
  (ii) a controlled release material coated directly onto at least a portion of said thermoplastic front surface of said first support member; and
  (iii) a vapor coated inorganic pigment coated directly onto at least a portion of said controlled release material,
(b) providing a receptor article comprising a second support member having a thermoplastic front surface; and
(c) transferring at least a portion of said inorganic pigment and at least a portion of said controlled release material from said donor article onto said receptor article by imagewise application of heat through said donor article to said controlled release material and said thermoplastic front surface of said receptor article, wherein during said imagewise application of heat said inorganic pigment is in contact with said thermoplastic front surface of said receptor article and sufficient pressure is applied to said donor article and said receptor article to provide intimate contact between said coated inorganic pigment and said thermoplastic front surface of said receptor article, to provide at least a portion of said inorganic pigment and at least a portion of said controlled release material on said receptor article;

Method II (a) providing a donor article, said donor article comprising
  (i) a first support member having a thermoplastic front surface;
  (ii) a controlled release material coated directly onto at least a portion of said thermoplastic front surface of said first support member; and
  (iii) a vapor coated inorganic pigment coated directly onto at least a portion of said controlled release material; and
  (iv) a thermoplastic material coated directly onto at least a portion of said inorganic pigment;
(b) providing a receptor article, said receptor article comprising a second support member; and
(c) transferring at least a portion of said inorganic pigment and at least a portion of said controlled release material from said donor article onto said receptor article by imagewise application of heat to said controlled release material, wherein during said imagewise application of heat through said donor article to said controlled release material and said coated thermoplastic material said coated thermoplastic material is in contact with said receptor article and sufficient pressure is applied to said donor article and said receptor article to provide intimate contact between said coated thermoplastic material and said receptor article, to provide at least a portion of said inorganic pigment, at least a portion of said controlled release material, and at least a portion of said coated thermoplastic material onto said receptor article; and Method III (a) providing a donor article, said donor article comprising
  a first support member having a thermoplastic front surface;
  (ii) a controlled release material coated directly onto at least a portion of said thermoplastic front surface of said first support member; and
  (iii) a vapor coated inorganic pigment coated directly onto at least a portion of said controlled release material,
(b) providing a receptor article comprising a second support member having a front surface and a thermoplastic material coated onto said front surface of said second support member; and
(c) transferring at least a portion of said inorganic pigment and at least a portion of said controlled release material from said donor article onto said receptor article by imagewise application of heat through said receptor article to said controlled release material and said thermoplastic material of said receptor article, wherein during said imagewise application of heat said inorganic pigment is in contact with said thermoplastic material of said receptor article and sufficient pressure is applied to said donor article and said receptor article to provide intimate contact between said coated inorganic pigment and said thermoplastic material of said receptor article, to provide at least a portion of said inorganic pigment and at least a portion of said controlled release material on said receptor article.

34. The method according to claim 33 wherein said controlled release material is selected from the group consisting a controlled release material comprising inorganic particles, a controlled release material comprising a low adhesive affinity organic material derived from latex, and a controlled release material comprising a wax derived from a wax dispersion, said controlled release material having a thickness up to one monolayer.

35. The method according to claim 33 wherein said controlled release material comprises at least two of inorganic particles, a low adhesive affinity organic material derived from a latex, or a wax derived from a wax dispersion, said controlled release material having a thickness up to one monolayer.

36. The method according to claim 33 wherein said controlled release material is selected from the group consisting of (a) a controlled release material comprising an admixture of inorganic particles and a high adhesive affinity latex; (b) a controlled release material comprising an admixture of at inorganic particles and a high adhesive affinity polymer derived from solution; and (c) a controlled release material comprising an admixture of at least one of a high adhesive affinity organic material derived from a latex or a high adhesive affinity polymer derived from a solution, and at least one of a low adhesive affinity organic material derived from a latex, a low adhesive affinity polymer derived from a solution, a wax derived from a wax dispersion, or a wax derived from a solution, said controlled release material of (b) having a thickness of up to one monolayer.

37. The method according to claim 33 wherein in Method III said second support member further comprises a back surface having a back coating coated thereon.

38. The method according to claim 33 wherein said imagewise application of heat is supplied by at least one of an electromagnetic radiation source and a thermal energy source.

* * * * *

UNITED STATES PATENT AND TRADEMARK OFFICE

CERTIFICATE OF CORRECTION

PATENT NO.: 5,437,912

DATED: August 1, 1995

INVENTOR(S): Chou et al.

It is certified that error appears in the above-identified patent and that said Letters Patent is hereby corrected as shown below:

Col. 14, line 55, "aleionized" should be --deionized--.

Col. 18, line 12, "Comparative Example 2" should be --Comparative Example B--.

Col. 18, line 14, "Example 1" should be --Comparative Example A--.

Col. 21, line 60, "respectively Resolution" should be --respectively. Resolution--.

Col. 22, line 15, "Comparative Example B" should be --Comparative Example D--.

Col. 26, line 20, "Examples 13 to 19" should be --Examples 7 to 13--.

Col. 26, line 34, "composition A" should be --Comparative Example G--.

Col. 27, line 68, "Example 13" should be --Example 7--.

Col. 28, line 29, "boshmite" should be --boehmite--.

Col. 31, line 43, "affiliity" should be --affinity--.

Col. 34, line 50, before "a first support" should be --(i)--.

Signed and Sealed this

Ninth Day of December, 1997

*Attest:*

Bruce Lehman

BRUCE LEHMAN

*Attesting Officer*

*Commissioner of Patents and Trademarks*